United States Patent
Nakashiba et al.

(10) Patent No.: US 11,808,974 B2
(45) Date of Patent: Nov. 7, 2023

(54) SEMICONDUCTOR DEVICE AND METHOD OF MANUFACTURING THE SAME

(71) Applicant: RENESAS ELECTRONICS CORPORATION, Tokyo (JP)

(72) Inventors: Yasutaka Nakashiba, Tokyo (JP); Shinichi Watanuki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 17/666,948

(22) Filed: Feb. 8, 2022

(65) Prior Publication Data

US 2023/0251418 A1   Aug. 10, 2023

(51) Int. Cl.
*G02B 6/132* (2006.01)
*G02B 6/12* (2006.01)
*G02B 6/125* (2006.01)
*G02B 6/136* (2006.01)

(52) U.S. Cl.
CPC ......... *G02B 6/12004* (2013.01); *G02B 6/125* (2013.01); *G02B 6/132* (2013.01); *G02B 6/136* (2013.01); *G02B 2006/12061* (2013.01); *G02B 2006/12142* (2013.01)

(58) Field of Classification Search
CPC ..................................................... G02B 6/132
See application file for complete search history.

(56) References Cited

U.S. PATENT DOCUMENTS

| | | | | |
|---|---|---|---|---|
| 2004/0109250 A1* | 6/2004 | Choi | ............... | G02B 26/001 359/883 |
| 2004/0264836 A1* | 12/2004 | Kawashima | ............ | G02F 1/025 385/14 |
| 2012/0288228 A1* | 11/2012 | Saito | ............... | H01S 5/021 385/14 |

FOREIGN PATENT DOCUMENTS

| | | | | |
|---|---|---|---|---|
| JP | 2019-139075 A | 8/2019 | | |
| WO | WO-0194640 A2 * | 12/2001 | ............. | B82Y 10/00 |
| WO | WO-2021016028 A1 * | 1/2021 | ......... | G02B 27/0172 |

* cited by examiner

*Primary Examiner* — Charlie Y Peng
(74) *Attorney, Agent, or Firm* — McDermott Will & Emery LLP

(57) ABSTRACT

A semiconductor device includes: a semiconductor substrate; an insulating layer formed on the semiconductor substrate; an optical waveguide formed on the insulating layer, extending in a first direction in a plan view, and being made of silicon; and an interlayer insulating film formed on the insulating layer to cover the optical waveguide. In this case, a crystal surface of a side surface of the optical waveguide is a (111) surface.

13 Claims, 10 Drawing Sheets

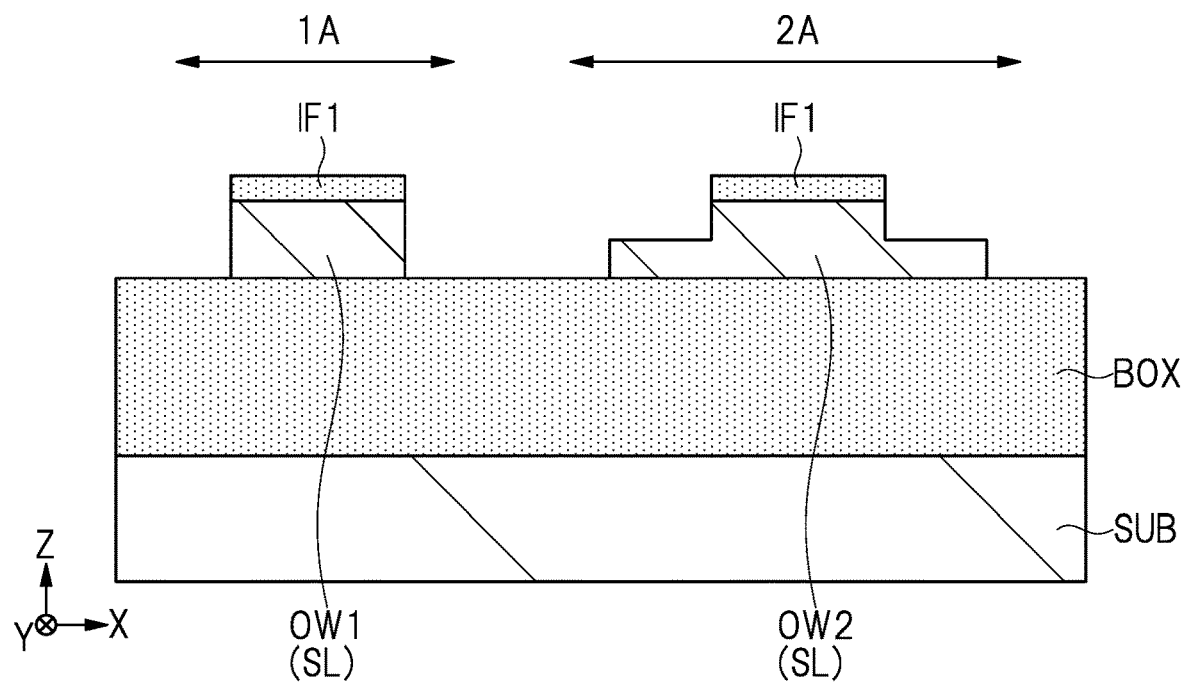
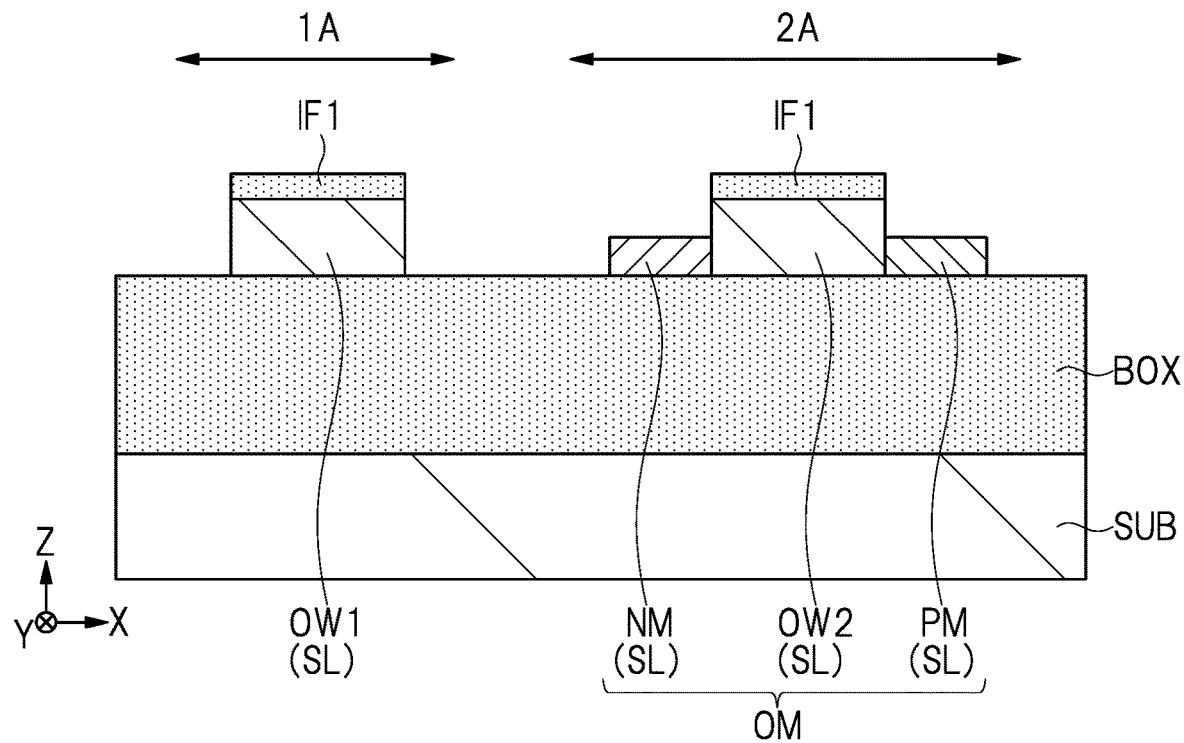

SEMICONDUCTOR DEVICE AND METHOD OF MANUFACTURING THE SAME

BACKGROUND

The present invention relates to a semiconductor device and a method of manufacturing the same, and relates to, for example, a semiconductor device including an optical device and a method of manufacturing the same.

In recent years, silicon photonics techniques of semiconductor devices performing optical communication have been developed. In such a silicon photonics technique, a transmission line for optical signals that is formed on a semiconductor substrate and that is made of a semiconductor material such as silicon is used. A photonics chip is made by integration of various optical devices made of the transmission line for optical signals and electronic devices.

There is a disclosed technique listed below.
[Patent Document 1] Japanese Unexamined Patent Application Publication No. 2019-139075

An optical waveguide is exemplified as one type of the transmission line transmitting the optical signals. The optical device including the optical waveguide has a problem of deterioration of optical characteristics such as increase in loss of the transmission, because of increase in roughness of a processed surface in a step of processing a semiconductor layer becoming the optical waveguide. The Japanese Unexamined Patent Application Publication No. 2019-139075 discloses a technique of reduction in the roughness by forming an epitaxial layer on upper and side surfaces of the semiconductor layer and using this epitaxial layer as the optical waveguide.

SUMMARY

A resist pattern is used in order to pattern the semiconductor layer becoming the optical waveguide. For further microfabrication patterning, an immersion technique using ArF laser has been developed. In order to reduce the roughness, it is also effective to use the immersion technique in place of the above-described technique of the Japanese Unexamined Patent Application Publication No. 2019-139075. However, a method of using the immersion technique that is expensive is difficult to reduce a manufacturing cost. Therefore, a technique of suppressing the increase in the manufacturing cost by an inexpensive processing method and reducing the roughness to reduce the loss in the transmission has been needed. Other object and novel characteristics will be apparent from the description of the present specification and the accompanying drawings.

A semiconductor device according to one embodiment includes: a semiconductor substrate; an insulating layer formed on the semiconductor substrate; an optical waveguide formed on the insulating layer, extending in a first direction in a plan view, and being made of silicon; and an interlayer insulating film formed on the insulating layer to cover the optical waveguide. In this case, a crystal surface of a side surface of the optical waveguide is a (111) surface.

A method of manufacturing a semiconductor device according to one embodiment includes: a step (a) of preparing an SOI substrate including a semiconductor substrate, an insulating layer formed on the semiconductor substrate, and a semiconductor layer formed on the insulating layer and being made of silicon; a step (b) of, after the step (a), forming an optical waveguide extending in a first direction in plan view by patterning the semiconductor layer; and a step (c) of, after the step (b), forming an interlayer insulating film formed on the insulating layer to cover she optical waveguide. An etching solution containing tetra methyl ammonium hydroxide is used in the step (b), and a crystal surface of a side surface of the optical waveguide after the step (b) is a (111) surface.

BRIEF DESCRIPTIONS OF THE DRAWINGS

FIG. 10 is a cross-sectional view showing a manufacturing step continued from FIG. 9.

FIG. 11 is a cross-sectional view showing a manufacturing step continued from FIG. 10.

DETAILED DESCRIPTION

Embodiments will be described in detail below on the basis of the accompanying drawings. In the all drawings for use in explaining the embodiments, the same element having the same function is denoted with the same reference symbol, and the repetitive description thereof will be omitted. Also, in the following embodiments, the explanation for the same or similar portions is not repeated in principle unless particularly required.

An X direction, a Y direction and a Z direction explained in the present application cross one another and are orthogonal to one another. In the present application, the Z direction is explained as up and down direction, a height direction or a thickness direction of a certain structure in some cases. A term "plan diagram" or "plan view" in the present application means, when a surface made by the X direction and the Y direction is defined as the "plane", viewing of this "plane" in the Z direction.

In embodiments, a p-type semiconductor means a semiconductor doped with an impurity such as boron (B) or boron difluoride ($BF_2$) and an n-type semiconductor means a semiconductor doped with an impurity such as arsenic (As) or phosphorus (P). The number of species of the dopant may be one or more. In embodiments, an i-type semiconductor means an intrinsic semiconductor or a p-type or n-type semiconductor having an impurity concentration that is smaller than $1×10^{17}/cm^3$.

In embodiments, note that a (110) surface and a (100) surface will be explained in some cases. In a cubical crystal in a point of view of crystallography, the (100) surface is a crystal surface that is equivalent to a (001) surface and a (010) surface, and the (110) surface is a crystal surface that is equivalent to a (1-10) surface, a (101) surface, a (10-1) surface, a (011) surface and a (01-1) surface.

(FIRST EMBODIMENT)
<STRUCTURE OF SEMICONDUCTOR DEVICE>

Figure 1:
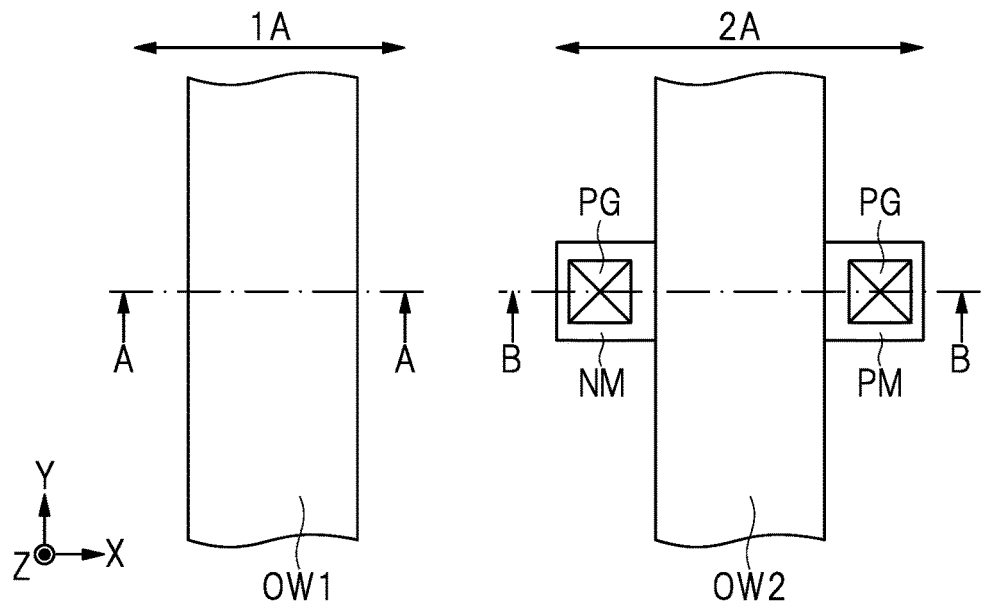
FIG. 1 is a plan view showing a semiconductor device according to a first embodiment.
Figure 2:
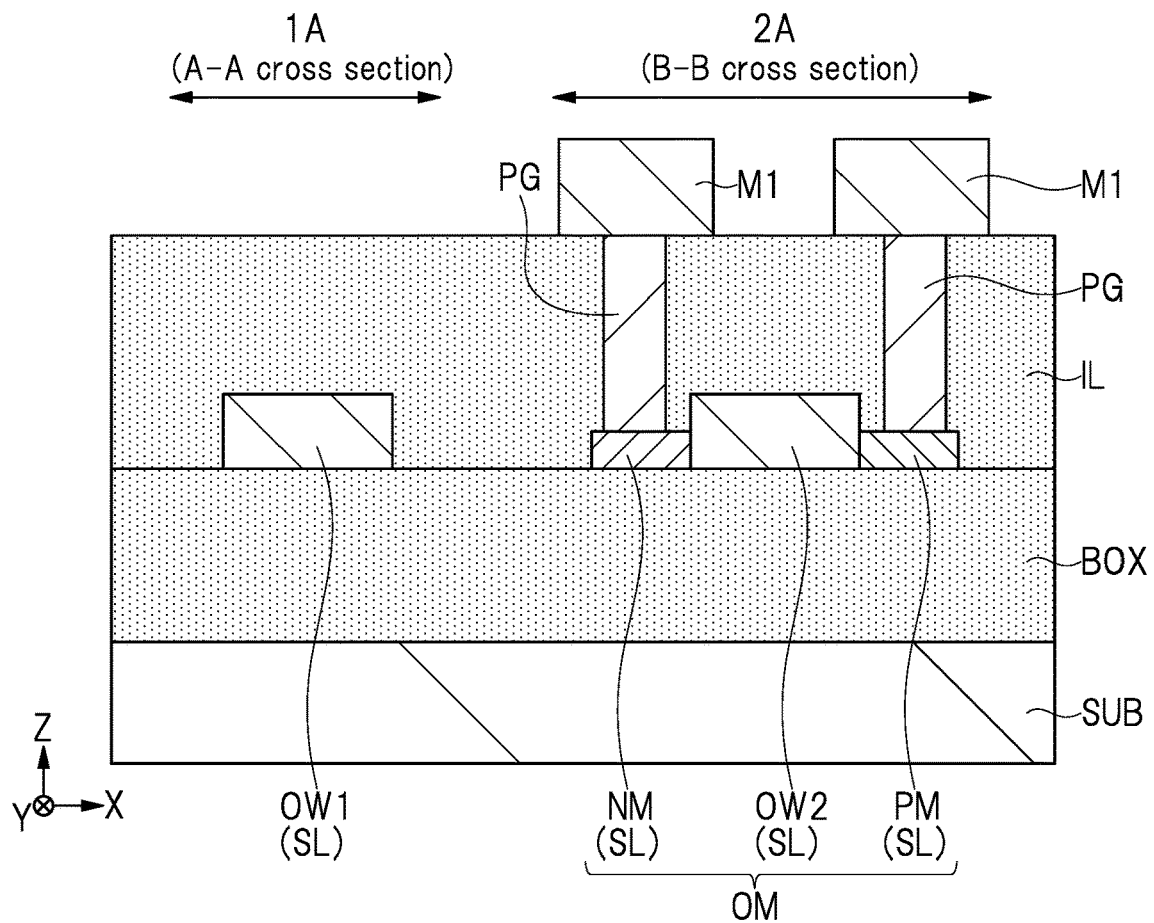
FIG. 2 is a cross-sectional view showing the semiconductor device according to the first embodiment.

With reference to FIGS. 1 and 2, a structure of a semiconductor device according to a first embodiment will be explained below. FIG. 1 is a plan view of a principal part of a photonics chip that is the semiconductor device, and FIG. 2 is a cross-sectional view taken along a line A-A and a line B-B shown in FIG. 1.

The semiconductor device of the first embodiment relates to a silicon photonics technique, and includes various optical devices (optical semiconductor elements). In this case, as such optical devices, an optical waveguide OW1 that is a transmission line for transmitting optical signals and an optical modulator OM for changing an optical phase in the optical waveguide are exemplified. The semiconductor device has a region 1A and a region 2A that is different from the region 1A. The optical. waveguide OW1 is formed in the region 1A, and the optical modulator OM is formed in the region 2A. In the semiconductor device, note that a light receiver, a grating coupler or others maybe formed as another optical device.

An SOI (Silicon on Insulator) substrate is used for the semiconductor device, the SOI substrate including a semiconductor substrate SUB, an insulating layer BOX formed on the semiconductor substrate SUB, and a semiconductor layer SL formed on the insulating layer BOX. The semiconductor substrate SUB is made of, for example, a p-type silicon. The insulating layer BOX is made of, for example, a silicon oxide. The semiconductor layer SL is made of, for example, an i-type silicon. A thickness of the insulating layer BOX is, for example, about 1 μm to 3 μm, and a thickness of the semiconductor layer SL is, for example, about 100 nm to 300 nm.

The semiconductor layer SL is mainly provided as a core layer of various optical devices, and the semiconductor layer SL in a region where each optical device is to be formed is variously processed in order to satisfy a necessary performance for each optical device. The structures of the optical waveguide OW1 and the optical modulator OM that are the optical devices exemplified in the first embodiment will be explained in detail below.

The optical waveguide OW1 is formed by processing the semiconductor layer SL, and functions as the transmission line for transmitting the optical signals between the optical modulator OM and another optical device. Therefore, as shown in FIG. 1, the optical waveguide OW1 has, for example, a lot of linear portions extending in the Y direction. On the insulating layer BOX, the interlayer insulating film IL is formed to cover the optical waveguide OW1. The interlayer insulating film IL is, for example, a silicon oxide film.

The insulating layer BOX and the interlayer insulating film IL function as cladding layers for substantially enclosing the optical signals in the optical waveguide OW1. Each material making the insulating layer BOX and the interlayer insulating film IL has a smaller refractive index than a refractive index of a material making the optical waveguide OW1. Each refractive index of the insulating layer BOX and the interlayer insulating film IL is, for example, 1.46. Note that the refractive indexes of the present specification mean numerical values with respect to light having a wavelength of 1.5 μm.

The optical modulator OM includes, for example, an optical waveguide OW2 extending in the Y direction, a p-type semiconductor layer PM and an n-type semiconductor layer NM. The p-type semiconductor layer PM is formed on one side surface of the optical waveguide OW2 in a direction. (X direction) crossing the extending direction of the optical waveguide OW2. The n-type semiconductor layer NM is formed on the other side surface of the optical waveguide OW2 in the direction (X direction) crossing the extending direction of the optical waveguide OW2. The optical waveguide OW2, the p-type semiconductor layer PM and the n-type semiconductor layer NM are made of the same semiconductor layer SL to be unified.

In order to easily understand the explanation, note that the extending directions of the optical waveguides OW1 and OW2 are set to the Y direction. However, these extending directions may be not only the Y direction, but also the X direction or a different direction from the Y and X directions.

The p-type semiconductor layer PM is doped with the impurity exhibiting the p-type conductivity, the n-type semiconductor layer NM is doped with the impurity exhibiting the n-type conductivity, and a conductivity of the optical waveguide OW2 is the i-type. In the optical modulator OM, a p-i-n structure diode is made of the p-type semiconductor layer PM, the i-type optical waveguide OW2 and the n-type semiconductor layer NM. A position of an upper surface of each of the p-type semiconductor layer PM and the n-type semiconductor layer NM is lower than a position of an upper surface of the optical waveguide OW2. In other words, the optical modulator OM is processed to have a rib structure (convex structure).

A contact hole is formed in the interlayer insulating film IL, and a plug PG is formed inside the contact hole. The plug PG is made of, for example, a barrier metal film such as a titanium nitride film and a conductive film such as a tungsten film. A wiring M1 is formed on the interlayer insulating film IL. The wiring M1 is made of, for example, a lower barrier metal film, a conductive film formed on the lower barrier metal film and an upper barrier metal film formed on the conductive film. The conductive film is, for example, an aluminium film. Each of the lower barrier metal film and the upper barrier metal film is, for example, a titanium nitride film.

The p-type semiconductor layer PM and the n-type semiconductor layer NM are connected to the wiring M1 through the plug PG. The wiring M1 is electrically connected to an electronic device such as a MISFET (Metal Insulator Semiconductor Field Effect Transistor) not illustrated. To each of the p-type semiconductor layer PM and the n-type semiconductor layer NM, a voltage controlled by the electronic device is applied.

By the application of the voltage to each of the p-type semiconductor layer PM and the n-type semiconductor layer NM, in other words, by application of a forward bias voltage to the p-i-n structure diode, a carrier density in the i-type optical waveguide OW2 is changed, and the refractive index of the light in the optical waveguide OW2 is changed. Correspondingly, a wavelength of the light travelling in the optical waveguide OW2 is changed, and therefore, a phase of the light travelling in the optical waveguide OW2 can be changed by the optical modulator OM.

In the first embodiment, note that the optical waveguide OW1 and the optical modulator OM have been explained as the different optical devices from each other. However, the optical waveguide OW1 and the optical modulator OM may be optical devices that are connected to each other. In other words, the optical waveguide OW1 and the optical waveguide OW2 of the optical modulator OM may be different optical waveguides or the same optical waveguide.

In the first embodiment, a crystal surface of each upper surface of the optical waveguides OW1 and OW2 is a (110) surface. And, a crystal surface of each side surface of the optical waveguides OW1 and OW2 is a (111) surface. A crystal surface of each upper surface of the p-type semiconductor layer PM and the n-type semiconductor layer NM is a (110) surface. And, a crystal surface of each side surface of the p-type semiconductor layer PM and the n-type semiconductor layer NM is a (111) surface. In other words, a crystal surface of an upper surface of the semiconductor layer SL is a (110) surface, and a crystal surface of a side surface of the semiconductor layer SL is a (111) surface. And, an angle made by the upper surface of the semiconductor layer SL and the side surface of the semiconductor layer SL is 90 degrees.

In other words, each side surface of the optical waveguides OW1 and OW2, the p-type semiconductor layer PM and the n-type semiconductor layer NM is processed by etching solution containing tetramethyl ammonium hydroxide (TMAH) until each of these crystal surfaces becomes the (111) surface. Therefore, each of these side surfaces becomes a flat surface having significantly-reduced roughness.

<ETCHING PROCESS USING ETCHING SOLUTION CONTAINING TMAH>

Figure 3:
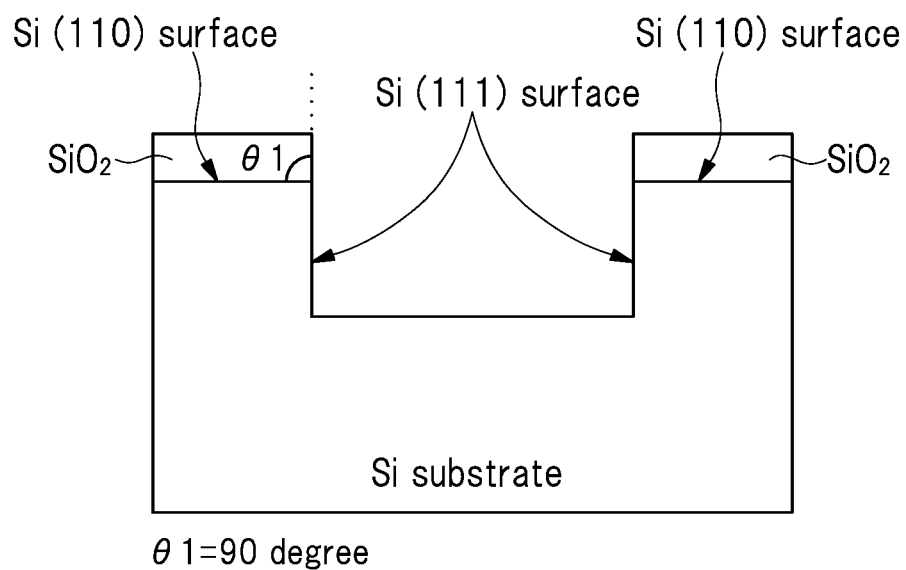
FIG. 3 is a schematic view showing a state of an etching process using etching solution containing TMAH.
Figure 4:
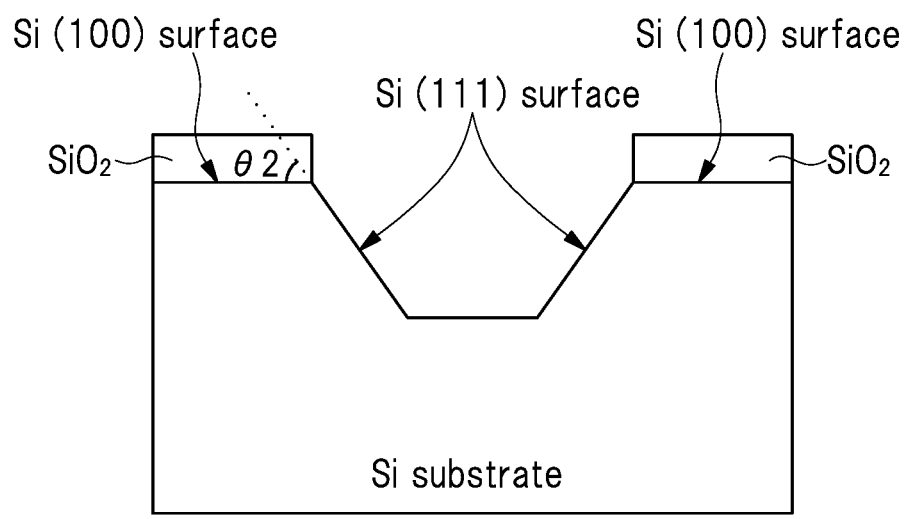
FIG. 4 is a schematic view showing a state of an etching process using etching solution containing TMAH.
Figure 5:
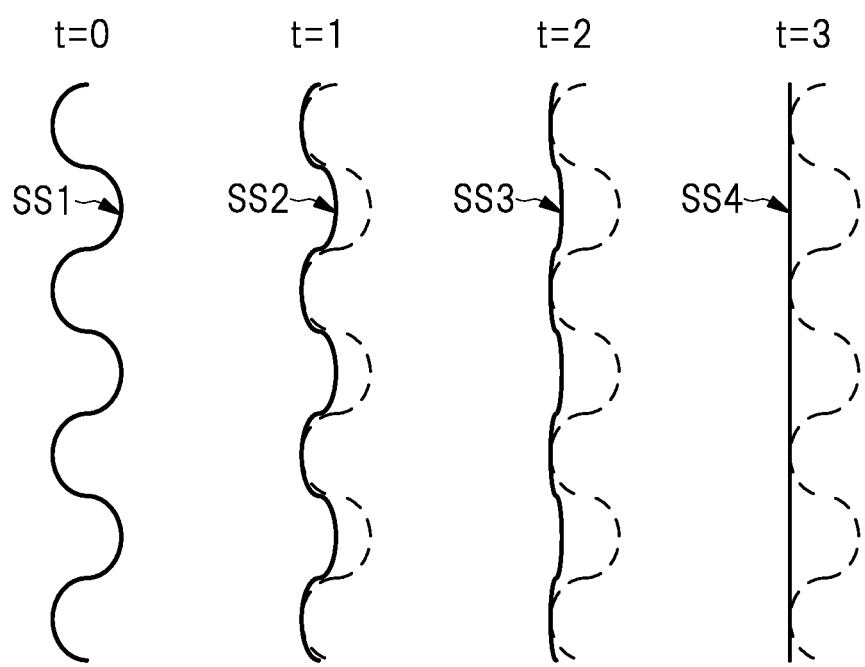
FIG. 5 is a schematic view showing change of a side surface of a semiconductor substrate due to the etching process in FIGS. 3 and 4.

With reference to FIGS. 3 to 5, an etching process using the etching solution containing TMAH will be explained below. Each of FIGS. 3 and 4 shows a state of the etching process using the etching solution containing TMAH to the semiconductor substrate made of silicon. FIG. 3 shows a case of the (110) surface as the crystal surface of the upper surface of the semiconductor substrate, and FIG. 4 shows a case of the (100) surface as the crystal surface of the upper surface of the semiconductor substrate.

A silicon oxide film is selectively formed on the semiconductor substrate, and the etching process using this silicon oxide as a mask and. using the etching solution containing TMAH is performed. In this manner, a trench is formed in the semiconductor substrate. After passage of certain time, a crystal surface of a side surface of the trench becomes the (111) surface. Therefore, the side surface of the trench becomes the flat surface. Note that an angle θ1 made by the upper surface of the semiconductor substrate and the side surface of the trench in FIG. 3 is 90 degrees, and an angle θ2 made by the upper surface of the semiconductor substrate and the side surface of the trench in FIG. 4 is 54.7 degrees.

FIG. 5 shows time passage in a case of the formation of the trench in the semiconductor substrate by an anisotropic dry etching method, followed by the etching process using the etching solution containing TMAH onto the side surface of the trench.

The roughness occurs on a side surface SS1 immediately after the anisotropic etching method. However, along with the time passage, the roughness on side surfaces SS2, SS3 and SS4 is sequentially reduced. At the end, all the crystal surfaces of the side surfaces of the trench become the (111) surface as shown in the side surface SS4, and the side surfaces become the flat surfaces.

By such a technique in the first embodiment, the roughness on each side surface of the optical waveguides OW1 and OW2, the p-type semiconductor layer PM and the n-type semiconductor layer NM can be reduced. Therefore, the transmission loss of the optical signals can be reduced. And, not the immersion technique using the ArF laser but the inexpensive processing method is applied, and therefore, the increase in the manufacturing cost can be suppressed.

Note that the etching process using alkaline solution of potassium hydroxide (KOH), sodium hydroxide (NaOH) or others in place of the TMAH is also applicable. However, the TMAH is generally used as, for example, a developer in formation of a resist pattern. Therefore, in a manufacturing process of the semiconductor device, the TMAH universally has an advantage of easiness in usage including clearance of the TMAH and others. Therefore, for the etching process, it is preferable to use the etching solution containing the TMAH.

<METHOD OF MANUFACTURING SEMICONDUCTOR DEVICE>

With reference to FIGS. 6 to 11, a method of manufacturing the semiconductor device according to the first embodiment will be explained below.

Figure 6:
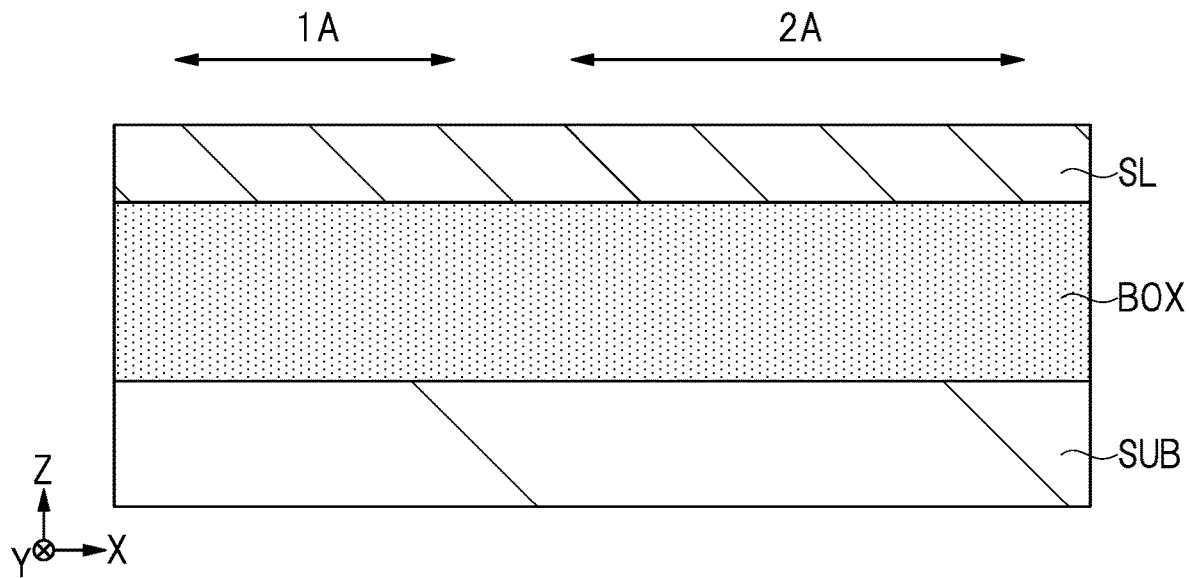
FIG. 6 is a cross-sectional view showing a manufacturing step of the semiconductor substrate according to the first embodiment.

First, the SOI substrate is prepared as shown in FIG. 6, the SOI substrate including the semiconductor substrate SUB that is a supporting substrate, the insulating layer BOX formed on the semiconductor substrate SUB, and the insulating layer SL formed on the insulating layer BOX. Note that the conductivity of the semiconductor layer SL is the i-type.

An example of a step of preparing such an SOI substrate will be explained below. The SOI substrate can be formed by, for example, a bonding method. In the bonding method, the insulating layer BOX is formed by oxidation of a surface of a first semiconductor substrate made of icon, and then, a second semiconductor substrate made of silicon is compressed on, and thus, is bonded with this insulating layer BOX under a high temperature. Then, the second semiconductor substrate is thinned. In this case, the thin film of the second semiconductor substrate remaining on the insulating layer BOX becomes the semiconductor layer SL, and the first semiconductor substrate below the insulating layer BOX becomes the semiconductor substrate SUB.

Figure 7:
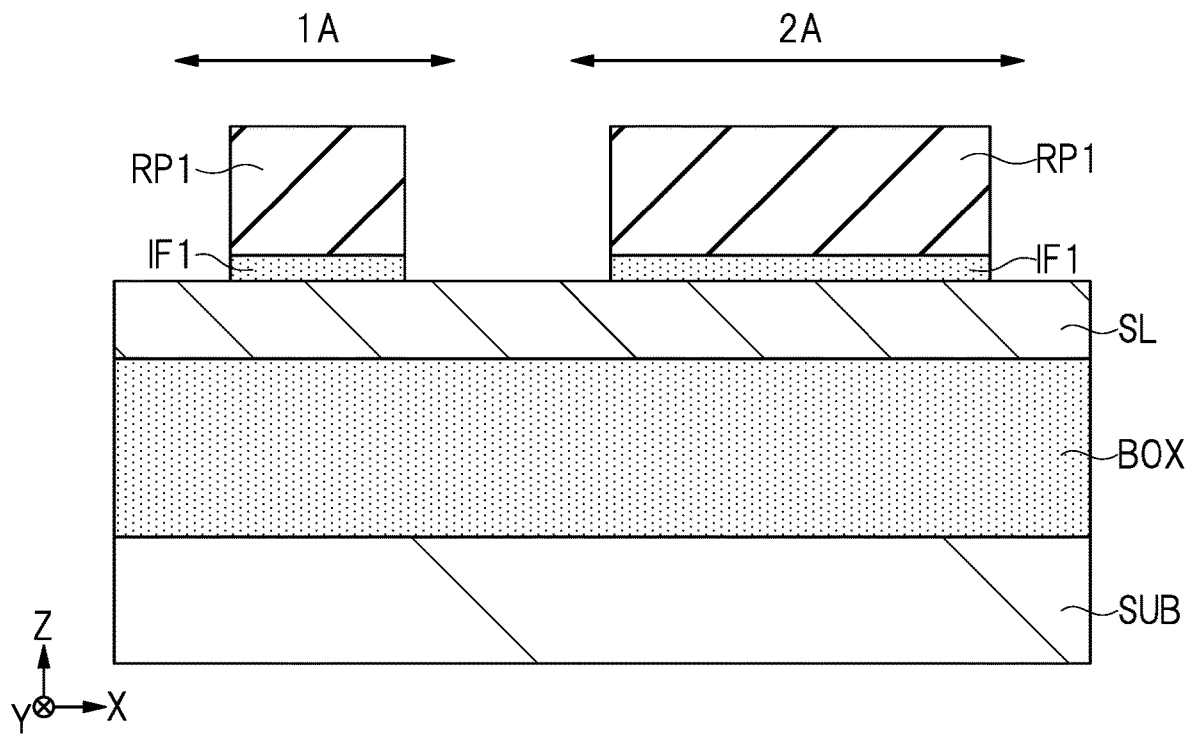
FIG. 7 is a cross-sectional view showing a manufacturing step continued from FIG. 6.

Next, as shown in FIG. 7, an insulating film IF1 is formed on the semiconductor layer SL by, for example, a CVD (Chemical Vapor Deposition) method. The insulating film IF1 is, for example, a icon oxide film, and has a thickness of, for example, 50 nm. Next, on the insulating film IF1, a resist pattern RP1 is formed. Next, the insulating film IF1 is patterns by, for example, the anisotropic dry etching method using the resist pattern RP1 as the mask. Then, the resist pattern RP1 is removed by an ashing process or others.

Figure 8:
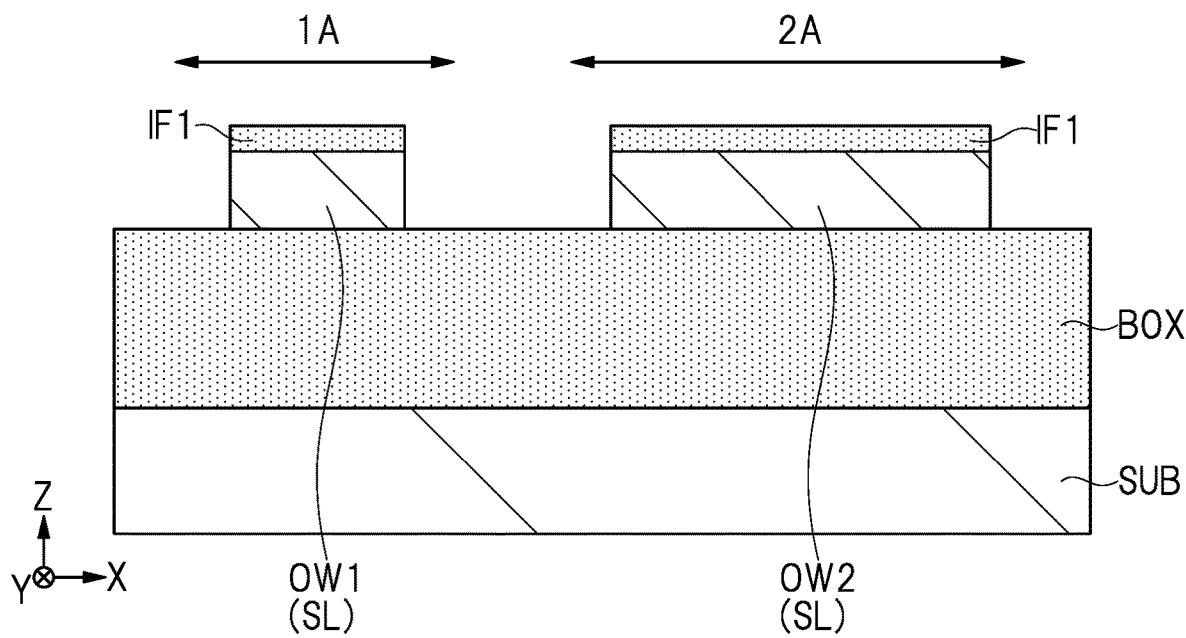
FIG. 8 is a cross-sectional view showing a manufacturing step continued from FIG. 7.

Next, as shown in FIG. 8, the semiconductor layer SL is patterned while using the insulating film IF1 as a mask and the etching solution containing the TMAH. In this manner, the optical waveguides OW1 and OW2 are formed. Note that each plan shape of the optical waveguides OW1 and OW2 is as shown in FIG. 1. In this state, the crystal surface of each upper surface of the optical waveguides OW1 and OW2 is a (110) surface, and the crystal surface of each side surface of time optical waveguides OW1 and OW2 is a (111) surface.

Figure 9:
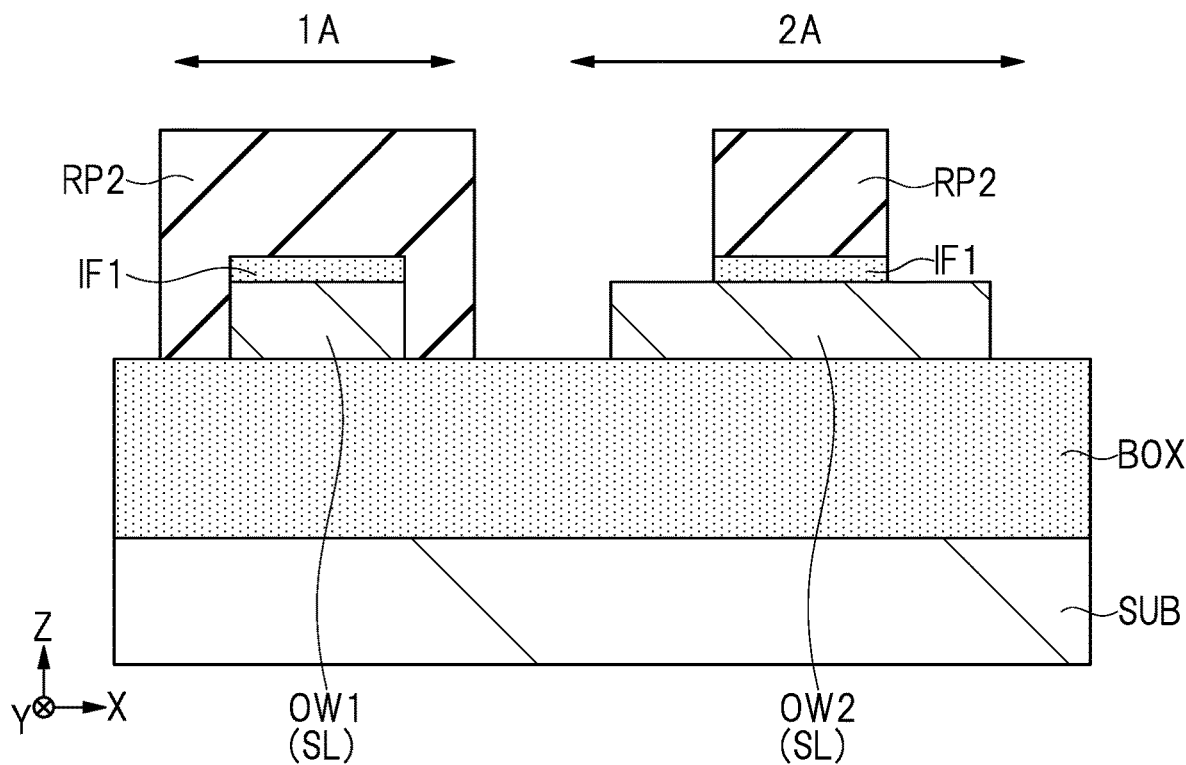
FIG. 9 is a cross-sectional view showing a manufacturing step continued from FIG. 8.

Next, as shown in FIG. 9, a resist pattern RP2 is formed on the insulating film IF1. The resist pattern RP2 has a pattern covering the optical waveguide OW1 but opening (exposing) a part of the optical waveguide OW2. Next, the insulating film IF1 is patterned by, for example, an anisotropic dry etching method using the resist pattern RP2 as a mask. In this manner, an upper surface of the part of the optical waveguide OW2 is exposed out. Then, the resist pattern RP2 is removed by an ashing process or others.

Next, as shown in FIG. 10, the upper surface of the part of the optical waveguide OW2 exposed out of the insulating film IF1 is receded by the etching solution containing the TMAH while using the insulating film IF1 as the mask.

Next, as shown in FIG. 11, the optical waveguide OW2, the upper surface of which is receded, is doped with the p-type impurity and the n-type impurity. In this manner, the p-type semiconductor layer PM and the n-type semiconductor layer NM are formed in a part of the semiconductor layer SL in the region 2A. By the above-described processes, the optical modulator OM having the rib structure is formed. In this state, the crystal surface of the side surface of the optical wavguide OW2 at the higher position than each upper surface of the p-type semiconductor layer PM and the n-type semiconductor layer NM is the (111) surface.

Note that the insulating film IF1 may remain as shown in the state of FIG. 11, or the insulating film IF1 may be removed by a hydrofluoric acid treatment or others. In this example, the case of the removal of the insulating film IF1 is exemplified. When the insulating film IF1 remains, the insulating film IF1 can function as the cladding layer.

Then, the semiconductor device as shown in FIG. 2 is manufactured after the following manufacturing steps. First, the interlayer insulating film IL is formed on the insulating layer BOX by, for example, a CVD method so as to cover the optical waveguide OW1 and the optical modulator OM. The interlayer insulating film IL is, for example, a silicon oxide film, and has a thickness of, for example, 700 to 1000 nm. Next, an upper surface of the interlayer insulating film IL is flattened by a CMP (Chemical Mechanical Polishing) method of polishing the interlayer insulating film IL.

Next, a contact hole reaching the p-type semiconductor layer PM and the n-type semiconductor layer NM is formed in the interlayer insulating film IL by a photolithography method and an anisotropic dry etching process. Next, a barrier metal film such as a titanium nitride film is formed in the contact hole by, for example, a sputtering method or a CVD method. Next, a conductive film such as a tungsten film is formed on the barrier metal film by, for example, a sputtering method or a CVD method. Next, the barrier metal film and the conductive film that are formed out of the contact hole are polished by, for example, a CMP method. In this manner, the plug PG is formed in the contact hole.

Next, the lower barrier metal film, the conductive film and the upper barrier metal film are sequentially formed on the interlayer insulating film IL by, for example, a sputtering method or a CVD method. Next, the wiring M1 connected to the plug PG is formed by, for example, an anisotropic dry etching method of patterning these films. Note that the conductive film is, for example, an aluminium film, and each of the lower barrier metal film and the upper barrier metal film is, for example, a titanium nitride film. Then, a plurality of wiring layers may be formed by further stacking a plurality of interlayer insulating films, a plurality of plugs and a plurality of wirings.

Figure 12:
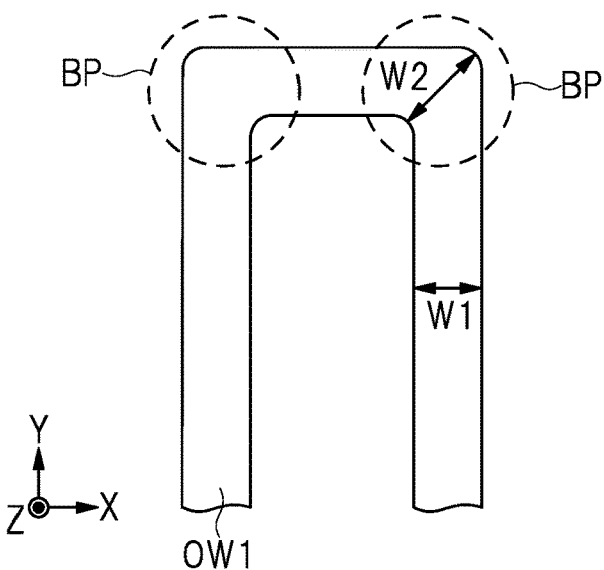
FIG. 12 is a plan view showing another portion of an optical waveguide according to the first embodiment.

Incidentally, the optical waveguide OW1 has a bending portion BP, an extending direction of which changes. For example, as shown in FIG. 12, the optical waveguide OW1 has a first portion extending in the Y direction, a second portion extending in the X direction, and the bending portion BP connecting the first portion and the second portion. In this case, a width W2 of the bending portion BP in a plan view is larger than a width W1 of the first portion in a plan view.

The (111) surface tends to be difficult to be formed on a side surface of such a bending portion BP even when the semiconductor layer SL is processed by the etching solution containing the TMAH. However, since an occupation ratio of the bending portion BP with respect to the entire optical waveguide OW1 is very small, the transmission loss of the optical signals in the entire optical waveguide OW1 is also very small. Although the (111) surface tends to be difficult to be formed on the side surface of the bending portion BP, the roughness is improved to some extent, and therefore, the transmission loss of the optical signals is smaller than that in the case without the usage of the etching solution containing the TMAH.

(SECOND EMBODIMENT)

Figure 13:
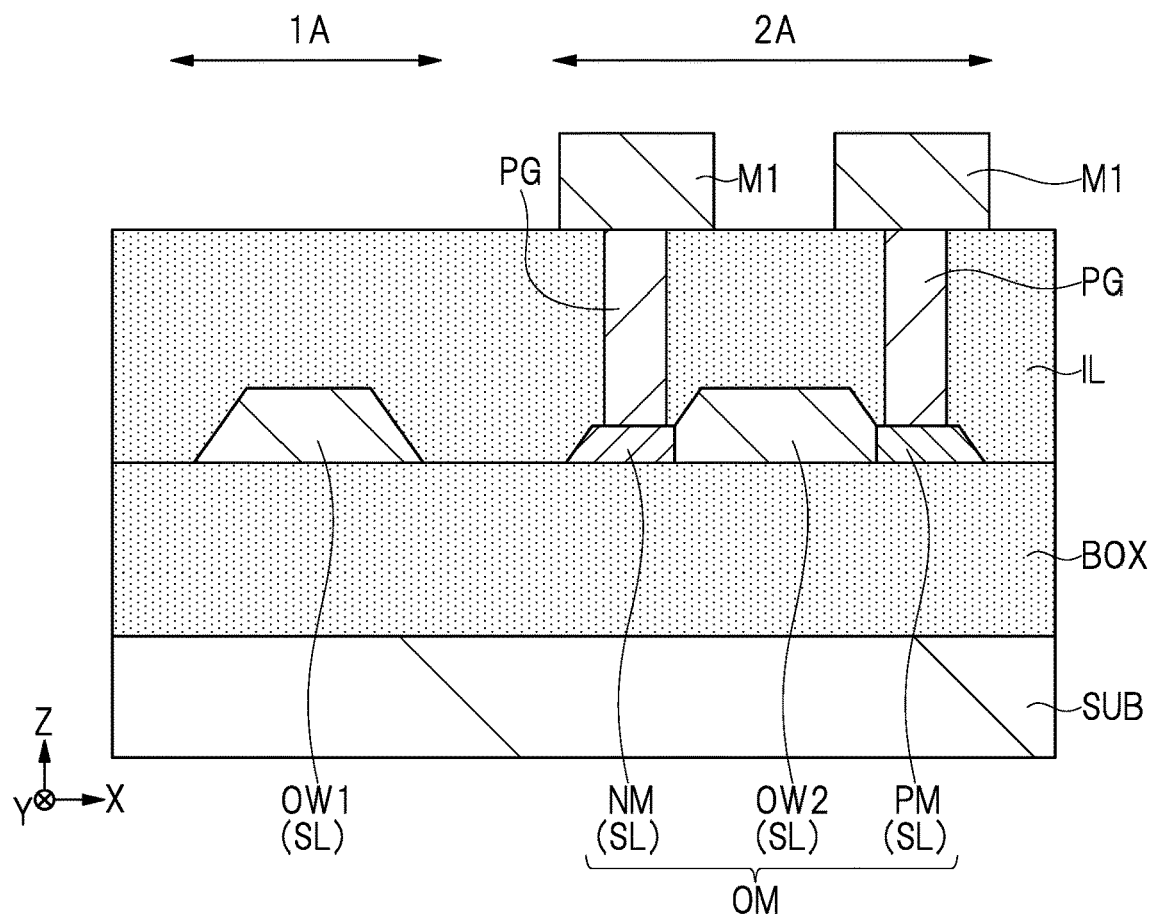
FIG. 13 is a cross-sectional view showing a semiconductor device according to a second embodiment.

With reference to FIG. 13, a semiconductor device of a second embodiment will be explained below. In the following explanation, note that differences from the first embodiment will be mainly explained, and explanation for overlap points with the first embodiment will be omitted.

In the first embodiment, the crystal surface of the upper surface of the semiconductor layer SL is the (110) surface. In the second embodiment, the crystal surface of the upper surface of the semiconductor layer SL is the (100) surface. In other words, the crystal surface of each upper surface of the optical waveguides OW1 and OW2, the p-type semiconductor layer PM and the n-type semiconductor layer NM is the (100) surface.

After the etching process using the etching solution containing the TMAH is performed to the (100) surface as explained in FIG. 4, the crystal surface of the side surface of the semiconductor layer SL becomes the (111) surface. In other words, the crystal surface of each side surface of the optical waveguides OW1 and OW2, the p-type semiconductor layer PM and the n-type semiconductor layer NM is the (111) surface. And, an angle made by the upper surface of the semiconductor layer SL and the side surface of the semiconductor layer SL is 54.7 degrees. When this angle is about 55 degrees, intensities of the optical signals are not distributed. Therefore, even in the second embodiment, the optical waveguides OW1 and OW2 can function as the transmission line for transmitting the optical signals.

Note that a method of manufacturing the semiconductor device according to the second embodiment is the same as the manufacturing method explained in the first embodiment except that the side surface of the semiconductor layer SL slopes.

(THIRD EMBODIMENT)

With reference to FIGS. 14 to 17, a semiconductor device of a third embodiment will be explained below. In the following explanation, note that differences from the first embodiment will be mainly explained, and explanation for overlap points with the first embodiment will be omitted.

In the first embodiment, the semiconductor layer SL is patterned by the etching solution containing the TMAH while using the insulating film IF1 as the mask. In the second embodiment, the insulating film IF1 and the semiconductor layer SL are patterned while using the resist pattern RP1 as the mask, and then, the etching process using the etching solution is performed to the side surface of the semiconductor layer SL.

Figure 14:
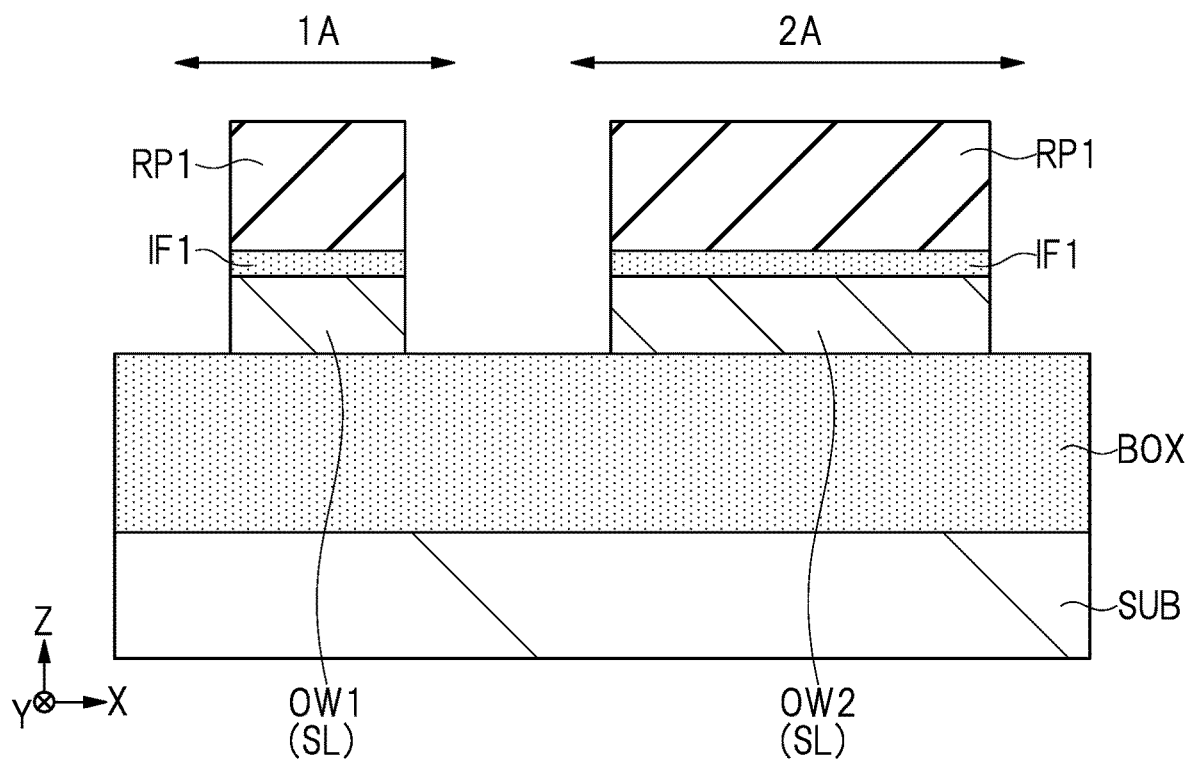
FIG. 14 is a cross-sectional view showing a manufacturing step of a semiconductor device according to a third embodiment.

In FIG. 14, the step of forming the resist pattern RP1 on the insulating film IF1 and the preceding steps as shown in FIG. 7 are the same as those of the first embodiment. In FIG. 14, the insulating film IF1 and the semiconductor layer SL are patterned by, for example, an anisotropic dry etching method using the resist pattern RP1 as the mask. Then, the resist pattern RP1 is removed by an ashing process or others.

Figure 15:
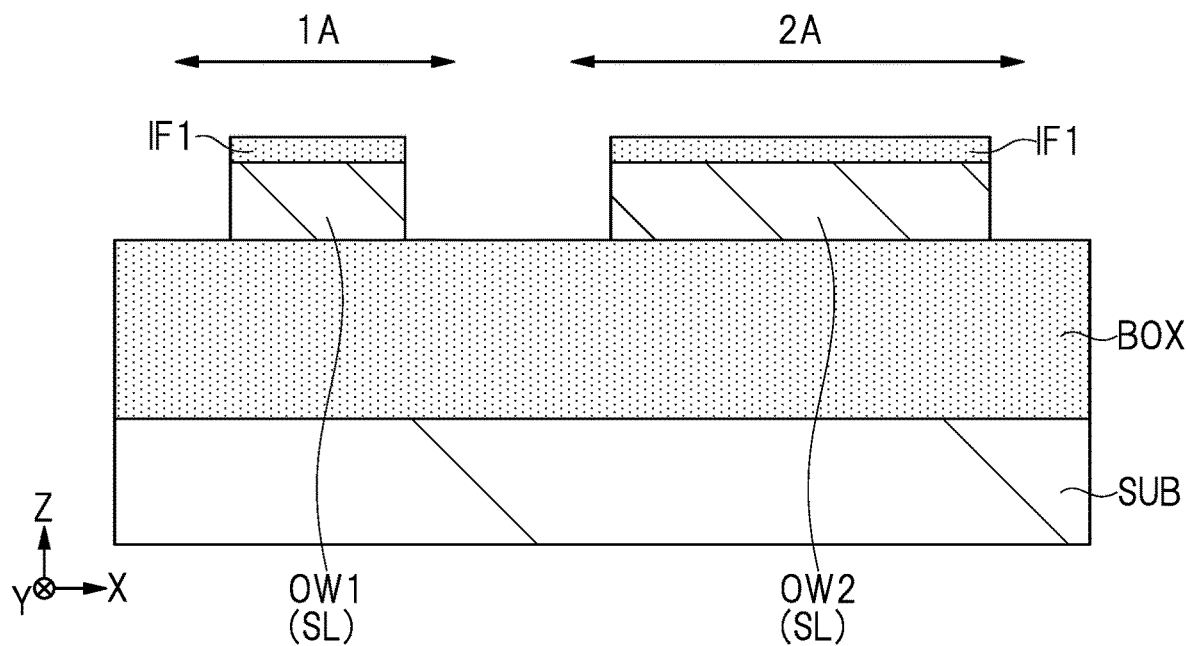
FIG. 15 is a cross-sectional view showing a manufacturing step continued from FIG. 14.

Next, as shown in FIG. 15, the etching process using the etching solution containing the TMAH is performed to the side surface of the semiconductor layer SL. After this etching process, the crystal surface of each upper surface of the optical waveguides OW1 and OW2 is the (110) surface, and the crystal surface of each side surface of the optical waveguides OW1 and OW2 is the (111) surface.

Figure 16:
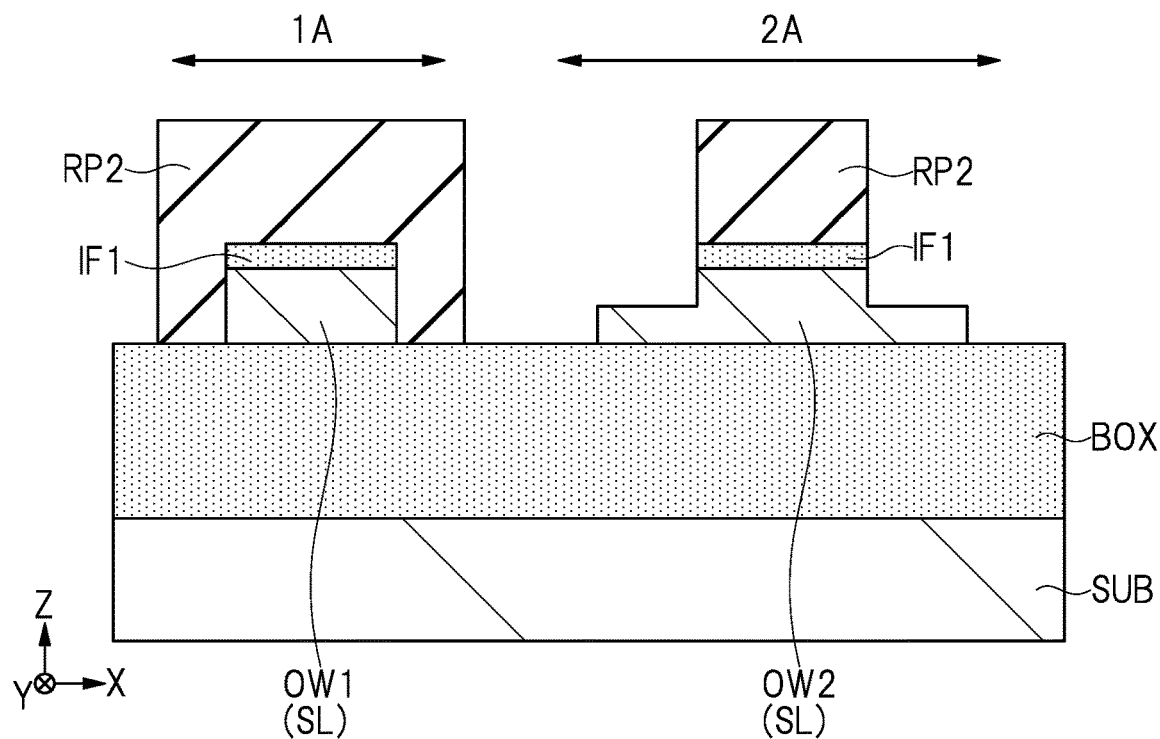
FIG. 16 is a cross-sectional view showing a manufacturing step continued from FIG. 15.

Next, as shown in FIG. 16, the resist pattern RP2 that is the same as that of the first embodiment is formed on the insulating film IF1. Next, the insulating film IF1 is removed by, for example, an anisotropic dry etching method using the resist pattern RP2 as the mask, and an upper surface of a part of the optical waveguide OW2 is receded. Then, the resist pattern RP2 is removed by an ashing process or others.

Figure 17:
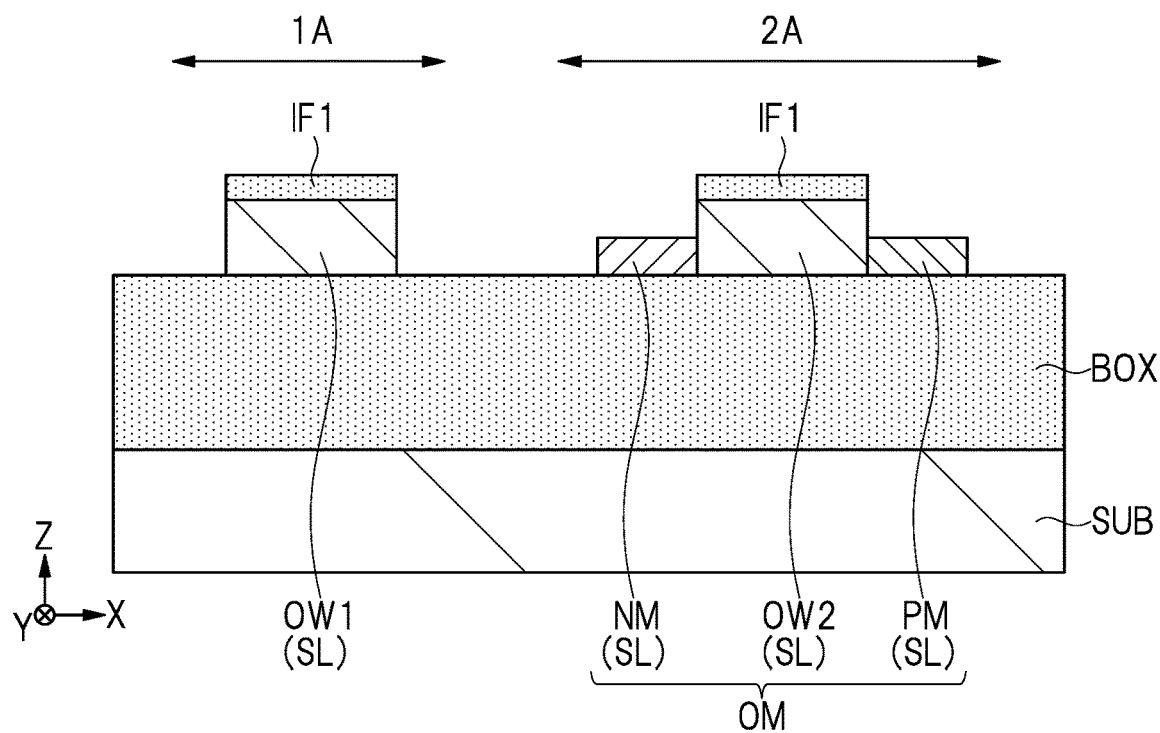
FIG. 17 is a cross-sectional view showing a manufacturing step continued from FIG. 16.

Next, as shown in FIG. 17, the etching process using the etching solution containing the TMAH while using the insulating film IF1 as the mask is performed to the side surface of the optical waveguide OW2.

Next, the optical waveguide OW2, the upper surface of which is receded, is doped with the p-type impurity and the n-type impurity by the photolithography method and the ion implantation method. In this manner, the p-type semiconductor layer PM and the n-type semiconductor layer NM are formed in a part of the semiconductor layer SL in the region 2A. By the above-described processes, the optical modulator OM having the rib structure is formed. In this state, the crystal surface of the side surface of the optical waveguide OW2 at the higher position than each upper surface of the p-type semiconductor layer PM and the n-type semiconductor layer NM is the (111) surface. The insulating film IF1 may be removed or left.

Then, the semiconductor device according to the third embodiment is manufactured by the same manufacturing steps as those of the first embodiment for forming the interlayer insulating film IL, the plug PG and the wiring M1.

In the above-described manner, even in the third embodiment, as similar to the first embodiment, the roughness on each side surface of the optical waveguides OW1 and OW2, the p-type semiconductor layer PM and the n-type semiconductor layer NM can be reduced. Therefore, the increase in the manufacturing cost can be suppressed, and the transmission loss of the optical signals can be reduced.

(Fourth Embodiment)

Figure 18:
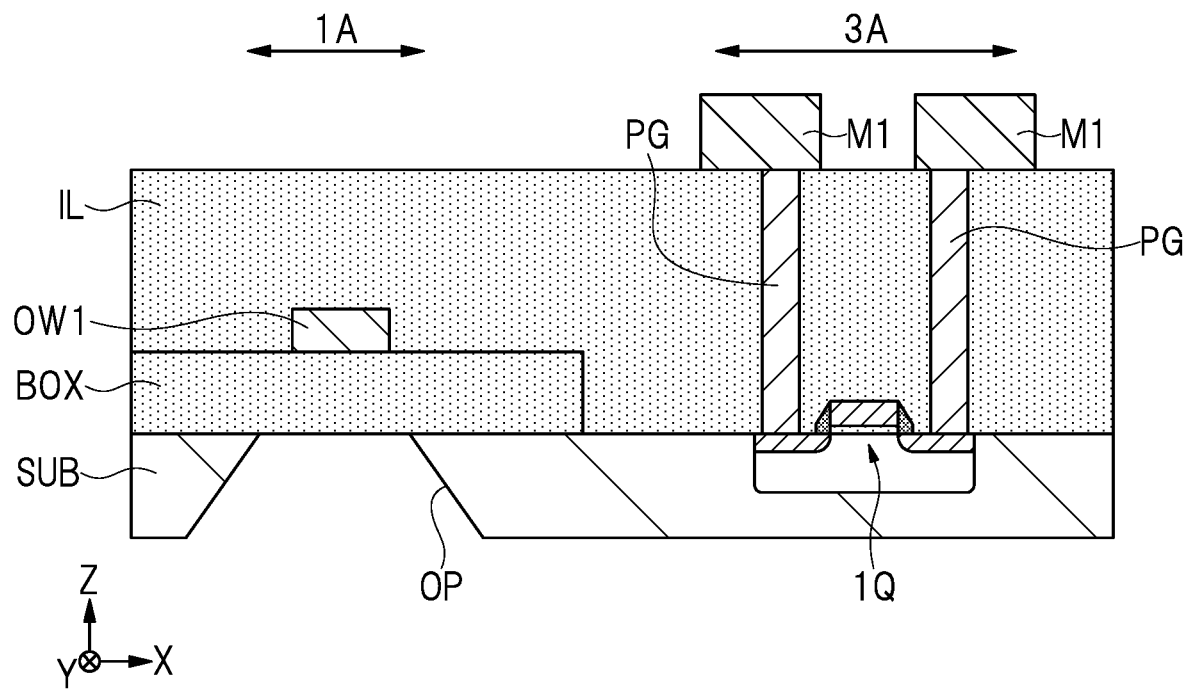
FIG. 18 is a cross-sectional view showing a semiconductor device according to a fourth embodiment.
Figure 19:
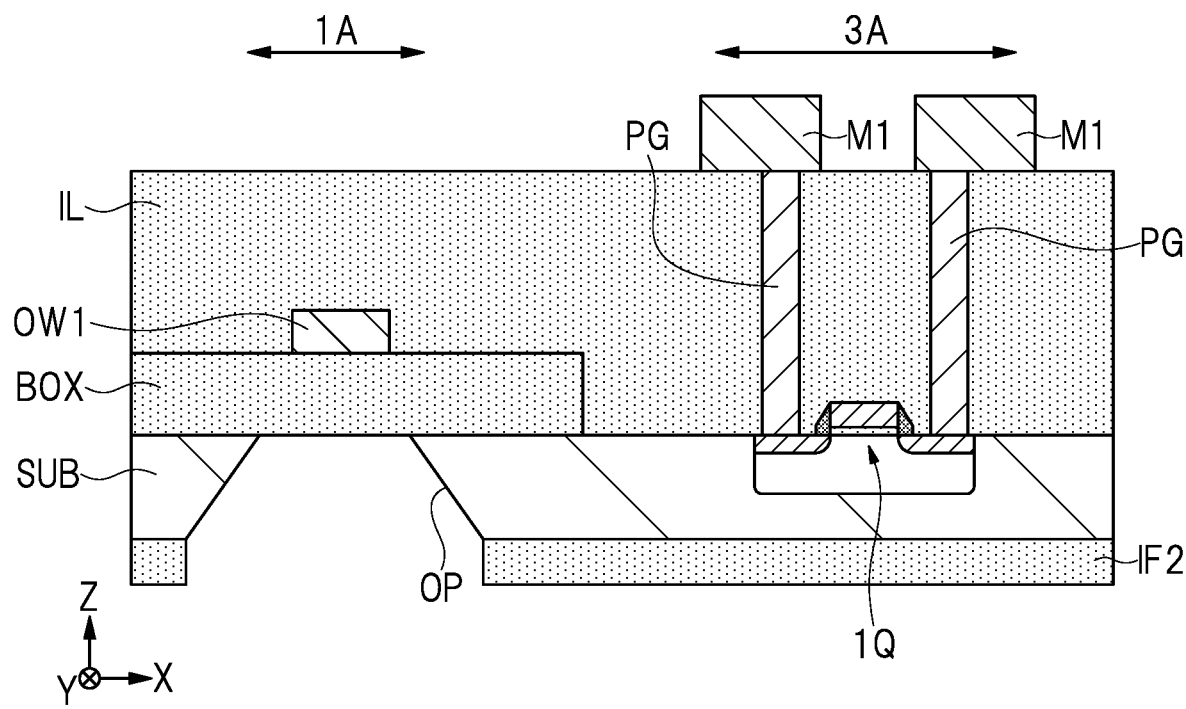
FIG. 19 is a cross-sectional view showing a manufacturing step of the semiconductor device according to the fourth embodiment.

With reference to FIGS. 18 and 19, a semiconductor device of fourth embodiment will be explained below. In the following explanation, note that differences from the first embodiment will be mainly explained, and explanation for overlap points with the first embodiment will be omitted.

As shown in FIG. 18, the semiconductor device of the fourth embodiment has a region A3 that is different from the region 1A and the region 2A. In the region 3A, the insulating layer BOX is removed, and the semiconductor substrate SUB is exposed out. And, on the semiconductor substrate SUB in the region 3A, an electronic device such as a MISFET 1Q is formed. The MISFET 1Q has a source region/drain region formed in the semiconductor substrate SUB, a gate insulating film formed on the semiconductor substrate SUB, a gate electrode formed on the gate insulating film and others. These source region, the drain region and the gate region are electrically connected to the wiring M1 through the plug PG.

Such a MISFET 1Q can be also electrically connected to the p-type semiconductor layer PM and the n-type semiconductor layer NM of the optical modulator OM through a plurality of plugs PG and a plurality of wirings M1. For example, the MISFET 1Q is also applicable to a voltage control circuit used in application of voltages to the p-type semiconductor layer PM and the n-type semiconductor layer NM.

As shown in FIG. 18, an opening OP may be formed in the semiconductor substrate SUB below the optical waveguide OW1. The opening OP includes at least a part of the optical waveguide OW1 in a plan view, and reaches the insulating layer BOX from a lower surface of the semiconductor substrate SUB. Note that the opening OP is filled with a sealing resin such as epoxy resin in a later step.

As described above, the transmission loss of the optical signals can be reduced by the removal of the semiconductor substrate SUB below the optical waveguide OW1. For example, leakage of the light from the optical waveguide OW1 occurs in some cases, and the leaked light reaches the semiconductor substrate SUB. However, there is a risk of no return of the leaked light to the optical waveguide OW1 since the light adversely propagates in the semiconductor substrate SUB. In this state, the transmission loss of the optical signals occurs. However, such a risk can be suppressed by the opening OP.

At the time of the formation of the opening OP, the etching process using the etching solution containing the TMAH may be performed. At this time, the crystal surface of the lower surface of the semiconductor substrate SUB may be the (110) surface, but more preferably the (100) surface. In either way, the crystal surface of the side surface of the opening OP is the (111) surface. However, when the crystal surface of the lower surface of the semiconductor substrate SUB is the (110) surface, an angle made by the lower surface of the semiconductor substrate SUB and the side surface of the opening OP is 54.7 degrees.

In other words, a cross-sectional shape of the opening OP is a taper shape having an opening radius that is smaller as being closer to the insulating layer BOX from the lower surface of the semiconductor substrate SUB. Since the opening OP has the taper shape, the opening OP is easily filled with the sealing resin. And, since the roughness on the side surface of the opening OP is reduced by the etching process using the etching solution containing the TMAH, the opening OP is easily densely filled with the sealing resin.

With reference to FIG. 19, manufacturing steps for forming the opening OP will be explained below.

As a basic technical concept, the manufacturing steps for the opening OP are the same as the steps for forming the optical waveguide OW1 by patterning the semiconductor layer SL (FIGS. 7 and 8 in the first embodiment or FIGS. 14 and 15 in the third embodiment).

First, a case of application of the technical concept in FIGS. 7 and 8 in the first embodiment will be explained.

As shown in FIG. 19, an insulating film IF2 is formed on the lower surface of the semiconductor substrate SUB by, for example, a CVD method. The insulating film IF2 is, for example, a silicon oxide film, and has a thickness of, for example, 200 nm. Next, a resist pattern is formed on the insulating film IF2. Next, the insulating film IF2 is patterned by, for example, an anisotropic dry etching method using the resist pattern as a mask. Then, the resist pattern is removed by an ashing process or others. Next, the opening OP is formed in the semiconductor substrate SUB by the etching solution containing the TMAH while using the insulating film IF2 as a mask. Then, the insulating film IF2 is removed by a hydrofluoric acid treatment or others.

A case of application of the technical concept in. FIGS. 14 and 15 in the third embodiment will be explained.

As shown in FIG. 19, an insulating film IF2 is formed on the lower surface of the semiconductor substrate SUB by, for example, a CVD method. Next, a resist pattern is formed on the insulating film IF2. Next, the insulating film IF2 and the semiconductor layer SL are removed by, for example, an anisotropic dry etching method using the resist pattern as a mask to form the opening OP. Then, the resist pattern is removed by an ashing process or others. Next, the etching process using the etching solution containing the TMAH is performed to the side surface of the opening OP. Then, the insulating film IF2 is removed by a hydrofluoric acid treatment or others.

In either way, the opening OP can be formed in the semiconductor substrate SUB. Note that the technique explained in the fourth embodiment is also applicable to the second embodiment and the third embodiment.

In the foregoing, the present invention has been concretely described on the basis of the embodiments. However, the present invention is not limited to the foregoing embodiments, and various modifications can be made within the scope of the present invention.

What is claimed is:

1. A semiconductor device comprising:
   a semiconductor substrate;
   an insulating layer formed on the semiconductor substrate;
   an optical waveguide formed on the insulating layer, extending in a first direction in a plan view, and being made of silicon; and
   an interlayer insulating film formed on the insulating layer to cover the optical waveguide,
   wherein a crystal surface of a side surface of the optical waveguide is a (111) surface, and
   wherein a crystal surface of an upper surface of the optical waveguide is a (100) surface.

2. The semiconductor device according to claim 1,
   wherein the optical waveguide has a first portion extending in the first direction, a second portion extending in a second direction crossing the first direction in a plan view, and a bending portion connecting the first portion and the second portion, and
   wherein a width of the bending portion in a plan view is larger than a width of the first portion in a plan view.

3. The semiconductor device according to claim 1,
   wherein an opening including at least a part of the optical waveguide in a plan view and reaching the insulating layer from a lower surface of the semiconductor substrate is formed in the semiconductor substrate below the optical waveguide,
   wherein the semiconductor substrate is made of silicon, and
   wherein a crystal surface of a side surface of the opening is a (111) surface.

4. The semiconductor device according to claim 3,
   wherein a crystal surface of a lower surface of the semiconductor substrate is a (100) surface.

5. The semiconductor device according to claim 1,
   wherein each of the insulating layer and the interlayer insulating film is a silicon oxide film.

6. A semiconductor device comprising:
   a semiconductor substrate;
   an insulating layer formed on the semiconductor substrate;
   an optical waveguide formed on the insulating layer, extending in a first direction in a plan view, and being made of silicon; and
   an interlayer insulating film formed on the insulating layer to cover the optical waveguide;
   a first region;
   a second region that is different from the first region; and
   a third region that is different from the first region and the second region,
   wherein a crystal surface of a side surface of the optical waveguide is a (111) surface,
   wherein the optical waveguide is formed in the first region and the second region,
   wherein an optical modulator is formed in the second region,
   wherein the optical modulator includes:
      the optical waveguide formed in the second region;
      a p-type semiconductor layer formed on one side surface of the optical waveguide in a second direction crossing the first direction in a plan view and being unified with the optical waveguide; and
      an n-type semiconductor layer formed on the other side surface of the optical waveguide in the second direction, and being unified with the optical waveguide,
   wherein a crystal surface of each side surface of the p-type semiconductor layer and the n-type semiconductor layer is a (111) surface,
   wherein the insulating layer is removed in the third region,
   wherein a MISFET is formed on the semiconductor substrate in the third region, and
   wherein the MISFET is electrically connected to the p-type semiconductor layer and the n-type semiconductor layer.

7. A method of manufacturing a semiconductor device, comprising the steps of:
   (a) preparing an SOI substrate including a semiconductor substrate, an insulating layer formed on the semiconductor substrate, and a semiconductor layer formed on the insulating layer and being made of silicon;
   (b) after the step (a), forming an optical waveguide extending in a first direction in a plan view by patterning the semiconductor layer; and
   (c) after the step (b), forming an interlayer insulating film formed on the insulating layer to cover the optical waveguide,
   wherein etching solution containing tetra methyl ammonium hydroxide is used in the step (b), and
   wherein a crystal surface of a side surface of the optical waveguide after the step (b) is a (111) surface, and
   wherein a crystal surface of an upper surface of the optical waveguide is a (100) surface.

8. The method of manufacturing the semiconductor device according to claim 7, wherein the step (b) includes the steps of:
   (b1) forming a first insulating film on the semiconductor layer;
   (b2) after the step (b1), forming a first resist pattern on the first insulating film;
   (b3) after the step (b2), patterning the first insulating film while using the first resist pattern as a mask;

(b4) after the step (b3), removing the first resist pattern; and
(b5) after the step (b4), patterning the semiconductor layer by the etching solution while using the first insulating film as a mask and using.

9. The method of manufacturing the semiconductor device according to claim 8, wherein each of the first insulating film, the insulating layer and the interlayer insulating film is a silicon oxide film.

10. The method of manufacturing the semiconductor device according to claim 7, wherein the step (b) includes the steps of:
(b6) forming a first insulating film on the semiconductor layer;
(b7) after the step (b6), forming a first resist pattern on the first insulating film;
(b8) after the step (b7), patterning the first insulating film and the semiconductor layer while using the first resist pattern as a mask;
(b9) after the step (b8), removing the first resist pattern; and
(b10) after the step (b9), performing an etching process using the etching solution while using the first insulating film as a mask to a side surface of the semiconductor layer.

11. The method of manufacturing the semiconductor device according to claim 10, wherein each of the first insulating film, the insulating layer and the interlayer insulating film is a silicon oxide film.

12. The method of manufacturing the semiconductor device according to claim 7 further comprising the step of
(d) after the step (c), forming an opening including at least a part of the optical waveguide in a plan view and reaching the insulating layer from a lower surface of the semiconductor substrate, in the semiconductor substrate below the optical waveguide,
wherein the etching solution is used in the step (d),
wherein the semiconductor substrate is made of silicon, and
wherein a crystal surface of a side surface of the opening after the step (d) is a (111) surface.

13. The method of manufacturing the semiconductor device according to claim 12, wherein a crystal surface of a lower surface of the semiconductor substrate is a (100) surface.

* * * * *